Nov. 18, 1952  W. C. STEINMETZ  2,618,519
IDLER ROLLER ASSEMBLY
Filed Feb. 28, 1950
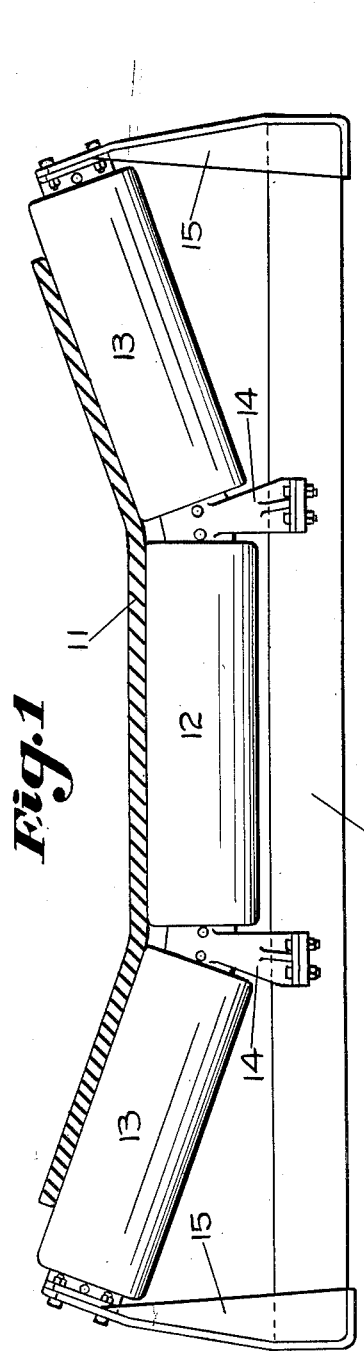
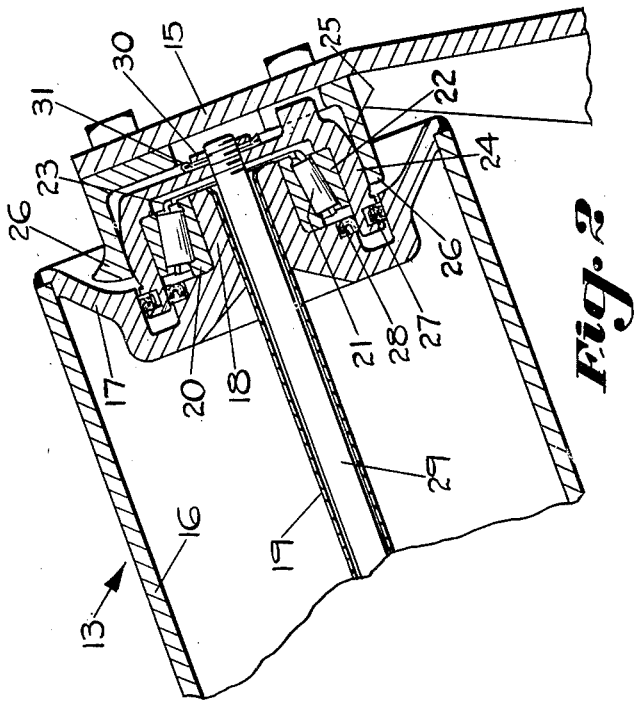
INVENTOR;
WALTER C. STEINMETZ,
BY
ATT'Y.

Patented Nov. 18, 1952

2,618,519

UNITED STATES PATENT OFFICE 2,618,519

IDLER ROLLER ASSEMBLY

Walter C. Steinmetz, Columbus, Ohio, assignor to The Jeffrey Manufacturing Company, a corporation of Ohio Application February 28, 1950, Serial No. 146,822

1 Claim. (Cl. 308—20).

This invention relates to an idler roller assembly of a type which is adapted for use in a troughing idler assembly, and an object of the invention is to provide such an idler roller assembly in which tapered roller bearings are employed, and the idler roller has hollow live stub axles upon which the inner races of tapered roller bearings are mounted, the outer races being carried in shells, the two shells of each roller being connected together by a connecting member extending through the idler roller.

In a more specific form of the invention the outer shell is provided with a bearing surface, such as a bearing surface forming a segment of a sphere, or a cylinder, which is supported in supporting brackets.

Other objects of the invention will appear hereinafter, the novel features and combinations being set forth in the appended claim.

In the accompanying drawings:

Fig. 1 is an elevational view of a troughing idler assembly incorporating features of my invention; and Fig. 2 is a sectional view showing the particular construction of one end of one of the rollers and the associated bearing, together with one of the supporting brackets and the connecting rod which connects the two shells of the bearing assemblies at opposite ends of the idler roller.

In the construction of heavy troughing idler rollers it is desirable to use tapered roller bearings as they have a larger capacity than ball bearings and are capable of carrying greater loads and taking greater end or axial thrusts. It is also desirable in such heavy duty idler rollers to provide what is known as a live shaft construction, that is, one in which the shaft of each idler roller rotates with the roller rather than being stationary. This invention provides an improved and efficient idler roller assembly having these desired characteristics.

As illustrated in Fig. 1 of the drawings, a heavy duty trough idler assembly is provided, including an angle base 10 which extends transversely of a longitudinally extending belt 11 adapted to be supported by a generally horizontal center idler roller 12 and upwardly and outwardly sloping end idler rollers 13. The idler rollers 12 and 13 are supported upon supporting brackets or arms 14 and 15 rigidly attached to the base 10. Each of the idler rollers 12 and 13 is of similar construction, as disclosed in detail in Fig. 2 of the drawings where one of the idler rollers 13 is shown.

The idler roller or roller assembly 13 includes a generally cylindrical roller 16 provided with similar integral end bells, one of which is seen at 17 which at its center has an integral live stub axle 18. A connecting tube 19 may be provided which extends between the two stub axles 18. Functionally the two stub axles 18 cooperate to provide an effective live axle for supporting the roller 16 at opposite ends. In other words, the stub axles 18 at opposite ends of roller 16 constitute a live axle, opposite ends of which are supported by identical means, as hereinafter described.

Each stub axle 18, or axle end, carries the inner race 20 of a tapered roller bearing means, said inner race 20 preferably having a tight or press fit with said live axle means 18. The complete roller bearing of which the inner race 20 is a part includes a plurality of tapered bearing rolls 21 which ride upon the inner race 20 and within an outer race 22 and are preferably carried in a conventional perforated sheet steel keeper 23. That is, the tapered roller bearing constituted by the members 20—23 is of a standard well known design which is capable of carrying a relatively heavy load, including relatively heavy axial thrusts, since there is one of these bearings on each end of the stub axle means 18 of roller 16.

Each outer race 22 has a tight or press fit with the inner surface of a cup or shell 24 which preferably has an outer bearing surface 25 which may be cylindrical or spherical in configuration and which is adapted to be received in and have bearing contact with a generally cylindrical retaining cup 26 carried by a bracket 15 or a bracket 14.

Grease seal means 27 is preferably provided between the inner peripheral surface of the shell 24 and a cooperating cylindrical surface on the end bell 17. Additional grease seal means 28 is also preferably provided between the inner cylindrical surface of the shell 24 and another cylindrical surface provided on the end bell 17.

To hold the two shells 24 in proper position, or, in other words, to adjust the tapered roller bearings 20—23, there is a connecting rod, member or shaft 29 which extends through the roller 16 and through the connecting tube 19 and preferably along the axis of rotation of the roller 16 and is adjustably and removably attached to the two opposite shells 24, as by being threaded into them or into nuts, such as the nut 30 rigidly attached to shell 24. A locking cotter key 31 or other locking means may be provided to lock the connecting rod 29 to the two nuts 30 for any position in which they may be adjusted.

Obviously those skilled in the art may make various changes in the details and arrangement of parts without departing from the spirit and scope of the invention is defined by the claim hereto appended, and applicant therefore wishes not to be restricted to the precise construction herein disclosed.

Having thus described and shown an embodiment of the invention, what it is desired to secure by Letters Patent of the United States is:

A cylindrical idler roller including similar integral end bells at opposite ends each forming at its center a hollow stub axle and a groove surrounding said stub axle having cylindrical walls, a tube extending axially through said roller interconnecting said stub axles, a roller bearing for each stub axle including an inner race having a tight fit with the stub axle and an outer race, a shell for each of said bearings having a tight fit with the outer race thereof and an outer peripheral surface formed as a segment of a sphere whereby said shells at opposite ends of the roller may be supported in cups to provide self aligning features for the bearings, said shell projecting into said groove in the end bell, radially expansible grease seal means for said bearing within the circular groove in said end bell cooperating with said bearing shell and the cylindrical walls of said groove, and rod means extending through said hollow stub axles, tube and end bells for adjusting said bearings and retaining the shells and associated bearing elements properly assembled on said roller.

WALTER C. STEINMETZ.

REFERENCES CITED

The following references are of record in the file of this patent:

UNITED STATES PATENTS

| Number | Name | Date |
|---|---|---|
| 833,326 | Hiler | Oct. 16, 1906 |
| 1,255,661 | Stewart | Feb. 5, 1918 |
| 1,572,093 | Stebler | Feb. 9, 1926 |
| 1,618,957 | Hunter | Feb. 22, 1927 |
| 1,772,711 | Dull | Aug. 12, 1930 |
| 2,285,647 | Deems | June 9, 1942 |